INVENTOR.
RUSSEL J. SHERMAN

United States Patent Office 2,720,119
Patented Oct. 11, 1955

2,720,119

FRICTION SURFACE ARTICLES HAVING HIGH DEGREE OF WEAR RESISTANCE

Russel J. Sherman, Great Neck, N. Y.

Application October 17, 1951, Serial No. 251,752

1 Claim. (Cl. 74—460)

My invention pertains in general to new and useful improvements in articles having a friction surface and to a new and novel method of encasing the friction surfaces of such articles with a plastic material having a high degree of wear resistance. The invention is particularly concerned with gear construction and to a new and novel method of encasing the working surfaces of gears with a material of the thermoplastic group, such as nylon, having a high degree of wear resistance.

Nylon plastic is preferred as the encasing element, because of its many desirable qualities. It is tough and durable, possessing a relatively high degree of resistance to wear and abrasion; it is inert to commercial solvents, resists attack by heat, oils and water under operating conditions, and allows for silent gear movements without need of lubrication. A gear having these qualities is highly desirable and represents a decided advance in the art.

Nylon plastic must, however, be properly handled, if it is desired to obtain all of the foregoing qualities in the resultant encased gear. If nylon plastic is machined, its wear resistant qualities will be materially reduced, and it then becomes subject to moisture absorption and distortion. Applications of thick quantities of this material will also result in distortion and other irregularities in the finished product. Nor can nylon plastic be applied to a gear core by spraying or dipping, as these operations will not produce a casing of uniform thickness.

Through my novel process a gear may be encased or coated with a predetermined and uniform thickness of nylon plastic, and the plastic may be applied in such manner as to retain all of those desirable qualities previously mentioned. While the invention is particularly concerned with gear construction and a method of applying to the gear a plastic having a relatively high degree of wear resistance, the invention may also be applied to any article having a friction surface, including bushings, cams, bearings and the like.

A general object of the invention is a method of encasing articles having a friction surface; such as, gears, bushings, cams, bearings and the like with a plastic material having a relatively high degree of wear resistance.

A more particular object of the invention is a gear coated with nylon plastic and a method of so coating the gear with this plastic as to retain all the highly desirable qualities of the plastic.

A further object of the invention is a gear encased in a thermoplastic material having a high degree of wear resistance, and a method of applying this plastic material to the gear with a predetermined thickness.

The foregoing objects and advantages of this invention, as well as others, will become apparent as this specification unfolds in greater detail, and as it is read in conjunction with the accompanying drawings, wherein a specific embodiment of the invention is disclosed.

Figure 1:
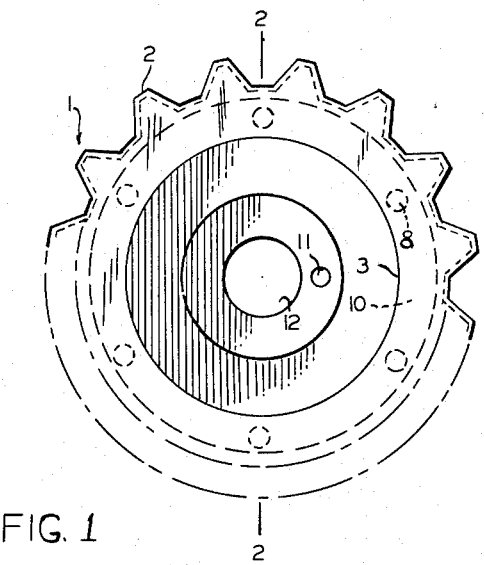
Fig. 1 is a plan view of a gear embodying the invention.
Figure 2:
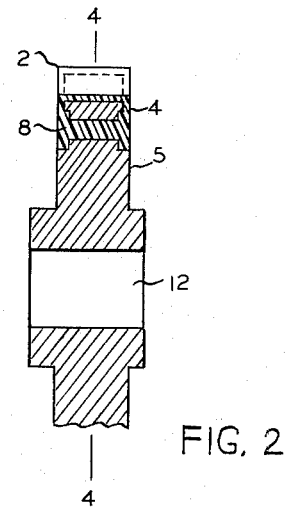
Fig. 2 is a cross section taken on the lines 2—2 of Fig. 1.
Figure 4:
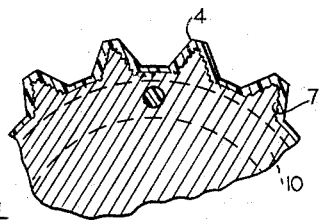
Fig. 4 is a fragment section taken on the lines 4—4 of Fig. 2.

In the drawings Figs. 1–4 there is disclosed a gear 1 having teeth 2. The teeth together with a marginal section 3 on both faces of the gear are encased in plastic material 4. The marginal sections 3 including the teeth are recessed slightly from the main body portion 5 of the gear as indicated at 6 in Fig. 3. The coating of plastic is thin, of uniform thickness, fills the recessed portions, and is securely molded to the gear. The sections of the gear where covered with the plastic material is scored or knurled as at 7, the cavities or valleys of which are filled with the plastic material. This roughing of the gear materially aids in strengthening the bond of the plastic casing to the gear. The grip of the plastic covering is further strengthened by tie rods 8 of plastic material. These tie rods are enabled through a plurality of holes 9 through the marginal portion of the gear body. In the process, hereinafter detailed, of encasing the gear with the plastic material, these holes 9 are filled with plastic. The plastic in the holes acts as a tie rod holding the plastic on the opposed surfaces of the gear together and thereby further anchoring the plastic casing to the gear. Further anchorage of the plastic covering to the gear surface is obtained by channels 10 about both faces of the gear containing plastic material.

The plastic material encasing the marginal sections and teeth of the gear is of the thermoplastic group, preferably nylon, because of its relatively high wear resistant qualities and other characteristics, previously mentioned which make it desirable in gear construction. The gear body 1, which here might be properly called a core or shell serving as a base for the plastic casing, is preferably of metal. The plastic casing 4 on the gear has a smooth unblemished skin possessing a high gloss. A gear so encased has all the highly desirable qualities, previously outlined, of the nylon plastic.

Figure 3:
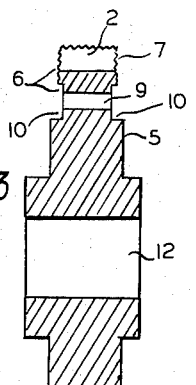
Fig. 3 is a view similar to that of Fig. 2, but showing the gear core without the plastic coating.

In describing the process by which a gear may be encased with plastic material as above, a core or gear 1 having teeth 2 is prepared for the subsequent casing. It is well roughened as by scoring or knurling as at 7. A series of tie rod holes 9 are made through the marginal sections 3, 3 of the gear. The marginal sections 3 on each side of the gear including the teeth are recessed slightly from the main body portion 5, as at 6 in Fig. 3. The extent of the recessing predetermines the thickness of the plastic casing to be applied. As shown in Fig. 3 a channel 10 representing the limit line of the plastic casing is preferably provided in both faces of the gear.

After being thoroughly cleaned of any oily substances and foreign matter, the gear core as prepared is placed in a suitable mold for injection molding with plastic. The gear core is accurately centered in the mold so as to insure a uniform spacing between the core and the walls of the mold. A guide hole 11 adapted to receive a conventional mold guide pin together with the axial opening 12 of the gear serve as a means of accurately centering the gear core in the mold. Accurately centering the gear core in the mold serves to insure a uniform thickness plastic material over the gear.

In the molding operation a thermoplast, such as nylon plastic is injected into the mold in conventional manner. Nylon is particularly adaptable in this process because of a characteristic when plasticised to enter and fill the thin spaces separating the parts of the gear to be encased with plastic from the walls of the mold. In the molding operation the plasticised nylon fills the roughened sections 7 in the gear, the tie rod holes 9, the channels 10, and encases the teeth and marginal sections 3 of the gear. Upon removing the encased gear from the mold it will be found that the outer surface 4 of the plastic coating is level with that of the main body section 5 of the gear core. It will also be found that the plastic casing has a smooth and unblemished skin with a very high gloss finish. No machining is required with a finish of this nature. This finish is in the nature of a hard, tough skin, that is inert to commercial solvents, resistant to attack by oils, heat and water under operating conditions, and possesses a relatively high degree of resistance to abrasion and wear. Through the preparations given to the gear core before the molding operation the casing becomes securely molded to the gear surface. The roughing of the surface serves to aid the plastic in adhering to the surface of the gear; the tie rods formed in the holes 9 tend to strengthen the grip of the plastic material on the opposite sides of the gear to the gear surface, while the channels 10 insure a firm bond of the plastic to the gear at the edges of the casing.

The cleaner, smoother and more highly polished the mold is, the more glossy and better will the desirable characteristics of the nylon plastic material be brought out. To insure a very high gloss and a smooth unblemished skin, the mold is preferably chromium plated.

Because of the relatively thin coating of nylon applied to the gear in the molding process, shrinkage of the plastic on cooling is reduced to a minium without distortion in the finished casing.

Figure 5:
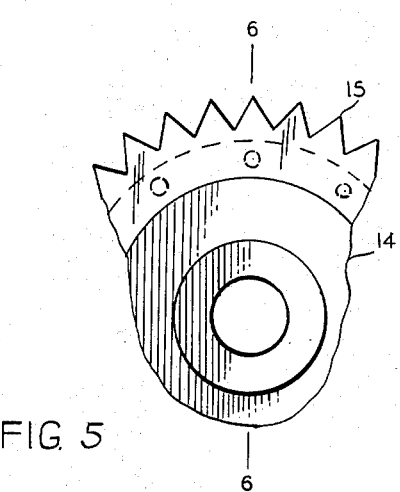
Fig. 5 is a fragmentary plan view of a gear illustrating a modified form of the invention.
Figure 6:
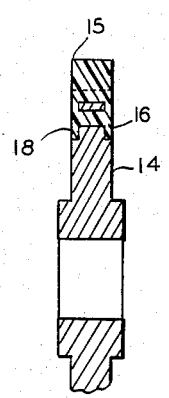
Fig. 6 is a cross section taken on the lines 6—6 of Fig. 5.

In the use of my process in encasing with plastic material very thin gears and gears having very small teeth, such as are used in watch and clock making, it is preferable that the core be without teeth. In this case instead of the finished gear having teeth with a molded plastic facing, the finished gear will have a rim of plastic material with solid plastic teeth formed by the mold. Figs. 5 and 6 disclose a gear of this type. Here the gear body 14 is without teeth. The teeth 15 of the gear are of plastic and are a part of the plastic rim 16 molded to the gear body. The gear body 14 is prepared in the manner of the gear core 1 above with the exception of the channels 10 and the roughing 6 which are not contained in the gear body 14, because of the thinness of the gear. The gear body 14 is, however, preferably roughened about its periphery as at 16. The core 14 is subjected to injection molding with plastic as above. In the molding process a rim of plastic 16 carrying solid plastic teeth 15 is molded to a marginal recessed portion 18 of the gear.

A gear core without teeth is advisable only with thin and fine toothed gears; it is not practicable in the case of the larger gears, because the relatively large amount of plastic that would be used in the molding process for the rim and solid plastic teeth would create difficulties of shrinkage and distortion in the resultant gear not found in the preferred form of the invention above.

Having described my invention above, it is my intent, however, to claim such invention not only as described, but also in all those forms and variations as may be reasonably construed to be within the spirit of the invention and within the scope of the appended claim.

What I claim as new, and to secure by Letters Patent is:

In a gear of the character set forth, a core of firm material having a main body portion and a toothed portion integral with the body portion, the marginal portion of the body and toothed portion being recessed slightly in of the main body portion, and a plastic casing molded to the toothed and marginal portions of the core, the plastic filling the recessed portions level to the surface of the main body portion, the plastic casing having an unmachined surface and possessing a high gloss and unblemished skin that has a high degree of wear resistance.

References Cited in the file of this patent
UNITED STATES PATENTS

| | | |
|---|---|---|
| 1,358,190 | Fitzpatrick | Nov. 9, 1920 |
| 1,472,147 | Bastian | Oct. 30, 1923 |
| 1,524,555 | Kempton | Jan. 27, 1925 |
| 1,978,985 | Cobb | Oct. 30, 1934 |
| 2,276,143 | Bell | Mar. 10, 1942 |
| 2,353,194 | Sherman | July 11, 1944 |
| 2,383,194 | Hoopes | Aug. 21, 1945 |
| 2,397,626 | Shriver | Apr. 2, 1946 |
| 2,553,590 | Joswig | May 22, 1951 |

OTHER REFERENCES

"Product Engineering," November 1950, page 229.
Ser. No. 391,198, Chapuis (A. P. C.), published June 15, 1943.